(12) United States Patent
Childress et al.

(10) Patent No.: US 7,409,314 B2
(45) Date of Patent: Aug. 5, 2008

(54) METHOD FOR FIRST PASS FILTERING OF ANOMALIES AND PROVIDING A BASE CONFIDENCE LEVEL FOR RESOURCE USAGE PREDICTION IN A UTILITY COMPUTING ENVIRONMENT

(75) Inventors: Rhonda L. Childress, Austin, TX (US); Miguel E. Gasca, Jr., San Bernardino, CA (US); Elfred Pagan, Austin, TX (US); Abigail A. Tittizer, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 70 days.

(21) Appl. No.: 10/902,591

(22) Filed: Jul. 29, 2004

(65) Prior Publication Data

US 2006/0025950 A1  Feb. 2, 2006

(51) Int. Cl.
*G06F 11/00* (2006.01)
(52) U.S. Cl. ...................................... 702/182
(58) Field of Classification Search ........................ None
See application file for complete search history.

(56) References Cited

U.S. PATENT DOCUMENTS

| | | | | |
|---|---|---|---|---|
| 5,768,544 A | | 6/1998 | Hauck ........................ 395/298 |
| 6,182,022 B1 | * | 1/2001 | Mayle et al. ................. 702/182 |
| 6,597,907 B1 | | 7/2003 | Pruitt et al. .................. 455/423 |
| 6,889,169 B2 | * | 5/2005 | Kirshenbaum et al. ...... 702/187 |
| 7,257,515 B2 | * | 8/2007 | Haeuptle ..................... 702/185 |
| 2002/0049838 A1 | * | 4/2002 | Sylor et al. .................. 709/224 |
| 2002/0107026 A1 | | 8/2002 | Agrawal et al. ............. 455/453 |
| 2002/0150054 A1 | | 10/2002 | Sohraby et al. ............. 370/252 |
| 2002/0183971 A1 | * | 12/2002 | Wegerich et al. ........... 702/185 |
| 2002/0198984 A1 | * | 12/2002 | Goldstein et al. ........... 709/224 |
| 2003/0023716 A1 | * | 1/2003 | Loyd ........................... 709/224 |
| 2003/0056126 A1 | | 3/2003 | O'Connor et al. ........... 713/300 |
| 2003/0061091 A1 | | 3/2003 | Amaratunga et al. .......... 705/10 |
| 2003/0139918 A1 | | 7/2003 | Hardwick et al. ............. 703/22 |
| 2003/0142139 A1 | | 7/2003 | Brown et al. ................. 345/800 |
| 2003/0142141 A1 | | 7/2003 | Brown et al. ................. 345/805 |
| 2004/0098478 A1 | * | 5/2004 | Koetke et al. ............... 709/224 |

* cited by examiner

*Primary Examiner*—John E Barlow, Jr.
*Assistant Examiner*—Jonathan Moffat
(74) *Attorney, Agent, or Firm*—Matt Talpis; Gregory K. Goshom; Greg Goshom, P.C.

(57) ABSTRACT

Provided is a method for monitoring resources in a utility computing environment (UCE). Measurements are evaluated to determine whether or not a particular resource requires remedial or other type of action. A sliding measurement window is employed to assemble a number of measurements corresponding to a particular resource. The number of intervals in a sliding measurement window is based upon best practices corresponding to the resource being measured and analyzed. A first threshold-crossing event and subsequent events are stored until the window is full, or closed. When the window is closed, the threshold-crossing measurements are analyzed to determine whether or not there exists an issue with the resource that requires action. Once a window has been closed and analyzed, the first threshold-crossing event and each subsequent event up to a second threshold-crossing event are discarded and the window reopens.

6 Claims, 7 Drawing Sheets

METHOD FOR FIRST PASS FILTERING OF ANOMALIES AND PROVIDING A BASE CONFIDENCE LEVEL FOR RESOURCE USAGE PREDICTION IN A UTILITY COMPUTING ENVIRONMENT

TECHNICAL FIELD

The present invention relates generally to management of a utility computing environment (UCE) and, more specifically, to a method for filtering anomalies that affect whether or not particular actions need to occur with respect to particular allocated resources.

BACKGROUND OF THE INVENTION

International Business Machines Corp. (IBM) of Armonk, N.Y. has frequently implemented new paradigms in business computing. Currently IBM is deploying products and services to support the "On Demand Business." An "On Demand Business" is an enterprise whose business processes are integrated end-to-end across the company and with key partners, suppliers and customers and which can respond with speed to any customer demand, market opportunity or external threat. The information technology (IT) infrastructure necessary to support the On Demand Business must be flexible and variable, i.e. able to meet fluctuating demand levels. One technique employed to provide a flexible and variable IT infrastructure is a utility computing service. Utility computing is information technology (IT) services based upon "power by the hour" in which a client pays only for the level of computing services actually used. In this paradigm, a resource may be allocated or deallocated based upon a customer's actual need for the resource.

Customers of a utility computing infrastructure transform their IT environment into a variable resource and pay only for the actual computing services received. The utility management infrastructure (UMI) provides the tools and services to effectively manage the utility computing environment. Like electricity, water and gas, IT is treated as another utility. Thus, by eliminating the responsibility of building and maintaining IT operations, providing necessary education and training to administrators, and having to comply with applicable regulations, the customer can focus on their core business while enjoying variable pricing, automated processes and the invaluable resilience and responsiveness of a shared infrastructure provided by the utility provider.

One issue that arises in a utility computing environment is how to determine when a particular event or condition indicates that remedial or other action needs to be initiated. For example, if a particular resource, e.g. memory, is detected to be in short supply, more of that particular resource might need to be made available or allocated. On the other hand, a shortage of memory may be the result of a large, but temporary data transfer. In other words, some events or conditions are more appropriately treated as an anomaly rather than indication of a change in requirements that necessitates the taking of action.

There are programs that provide for the monitoring of a resource, typically either by polling the resource or based on a periodic communication by the resource. However, current systems do not provide a way to filter anomalous events such that such events are ignored or discarded and unwarranted and unnecessary actions are prevented.

SUMMARY OF THE INVENTION

Provided is a method for monitoring resources in a utility computing environment (UCE), in which events are evaluated to determine whether or not a particular event necessitates remedial or other type of action. A sliding measurement window is employed to assemble a number of measurements corresponding to a particular resource, thus gaining a base confidence level with respect to the resource. The system filters usage spikes and other anomalies, preventing the anomalies from initiating further, more detailed analysis or action.

A number of intervals spanned by a sliding measurement window is based upon best practices corresponding to the resource being measured and analyzed. Events are monitored until a threshold-crossing event is detected and then a window is opened with the threshold-crossing event stored as the window's first element. Prior to the first threshold-crossing events, measurements are discarded, i.e. not stored in a window. Events subsequent are stored until the window closes.

The window is closed when the number of intervals in the window equals the number of measurements. Once the window is closed, the stored events are analyzed to determine whether or not there exists an issue with the resource that requires further action. In other words, the analysis determines if there is a base confidence that a non-anomalous event has occurred.

Once a window has been closed and analyzed, measurements starting with the first threshold-crossing event and ending with the event immediately prior to the second threshold-crossing event are discarded and the number of intervals is incremented by the number of discarded measurements. If a window is fully opened, i.e. there are no threshold-crossing events subsequent to the first such event, all events are discarded, i.e. not stored in the window, until another threshold-crossing event is detected.

Thus, the window "slides" along with threshold-crossing events, acting as a first pass for spike and other anomaly detection. This system reduces the need for unnecessary event analysis, including perhaps human intervention. Once a window is closed, the number of threshold crossing events is compared to the number of total events within the window and, depending upon the percent of threshold crossing events, the event within the window may be passed to another module for further analysis.

Inputs to a sliding measurement window can be used to create future resource usage predictions. The output of the system is an event or events that must be more extensively analyzed. Such analysis can be, but is not limited to, rules based analysis, pattern matching or some other form of analysis.

BRIEF DESCRIPTION OF THE DRAWINGS

A better understanding of the present invention can be obtained when the following detailed description of the disclosed embodiments is considered in conjunction with the following drawings, in which.

DETAILED DESCRIPTION OF THE FIGURES

Although described with particular reference to a utility computing environment (UCE) or utility management infrastructure (UMI), the claimed subject matter can be implemented in any information technology (IT) system in which the automatic monitoring and/or management of resources is desirable. Those with skill in the computing arts will recognize that the disclosed embodiments have relevance to a wide variety of computing environments in addition to those described below. In addition, the methods of the disclosed invention can be implemented in software, hardware, or a combination of software and hardware. The hardware portion can be implemented using specialized logic; the software portion can be stored in a memory and executed by a suitable instruction execution system such as a microprocessor, personal computer (PC) or mainframe.

In the context of this document, a "memory" or "recording medium" can be any means that contains, stores, communicates, propagates, or transports the program and/or data for use by or in conjunction with an instruction execution system, apparatus or device. Memory and recording medium can be, but are not limited to, an electronic, magnetic, optical, electromagnetic, infrared or semiconductor system, apparatus or device. Memory and recording medium also includes, but is not limited to, for example the following: a portable computer diskette, a random access memory (RAM), a read-only memory (ROM), an erasable programmable read-only memory (EPROM or flash memory), and a portable compact disk read-only memory or another suitable medium upon which a program and/or data may be stored.

Figure 1:
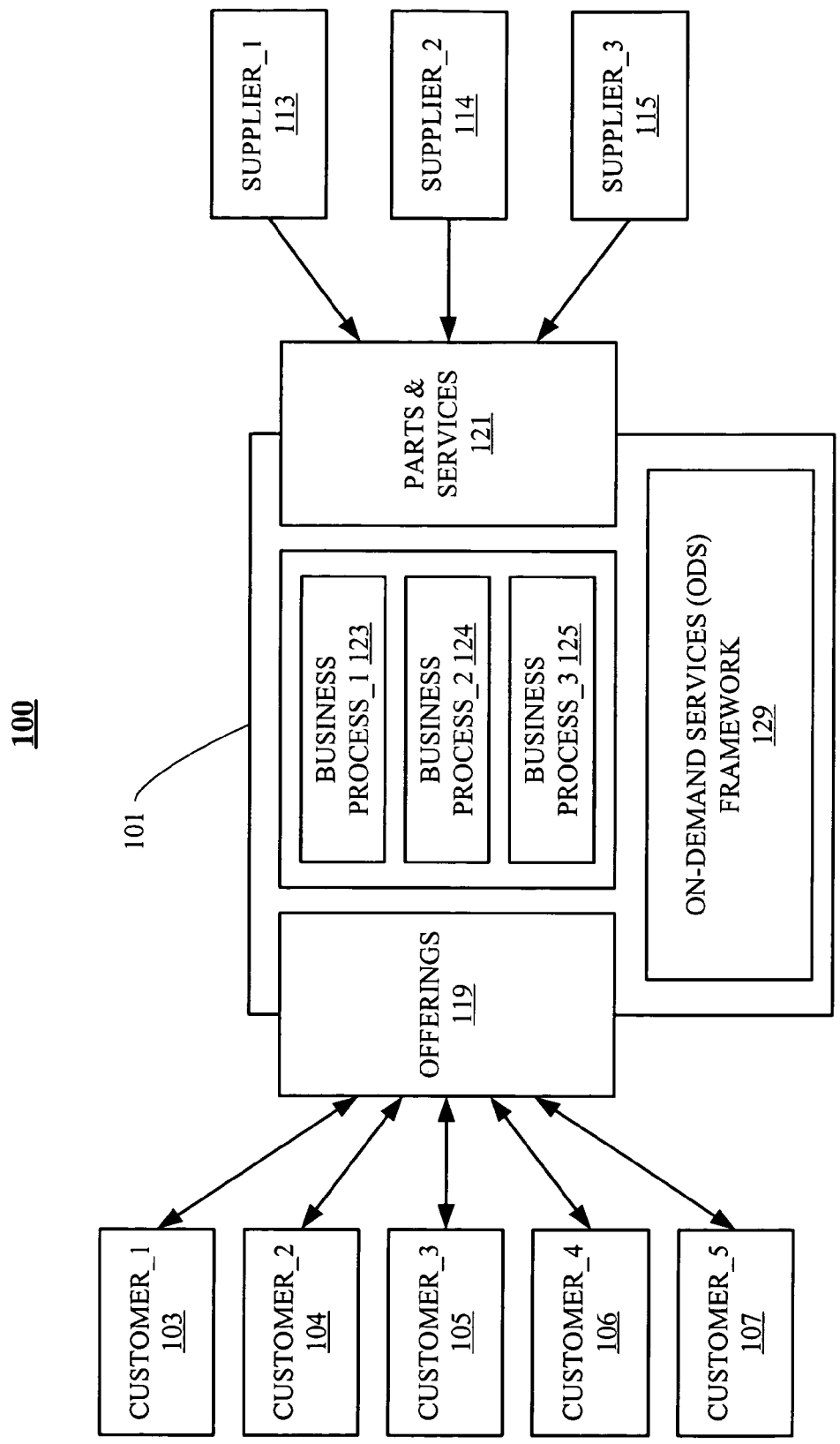
FIG. 1 is a block diagram of an exemplary Universal Management Infrastructure (UMI) architecture incorporating the claimed subject matter.

Turning now to the figures, FIG. 1 is a block diagram of an exemplary Universal Management Infrastructure (UMI) architecture 100 incorporating the claimed subject matter. An enterprise 101 services a number of customers, such as a customer_1 103, a customer_2 104, a customer_3 105, a customer_4 106 and a customer_5 107. Enterprise 101 also has relations with a number of suppliers, a supplier_1 113, a supplier_2 114 and a supplier_3 115. For the sake of this example, the particular type of business engaged in by enterprise 101 is not specified because UMI architecture 100, as well as the claimed subject, matter can be applied to practically any type of business that employs an information technology (IT) infrastructure. In fact, UMI architecture 100 can even apply to a hypothetical business that does not have customers and/or suppliers.

In this example, suppliers 113-5 provide parts and services 121 to enterprise 101 and customers 103-7 purchase products, or offerings, 119. Enterprise 101 includes a business process_1 123, a business process_2 124 and a business process_3 125 to enable enterprise 101 to convert parts and services 121 into offerings 119. Examples of types of business processes include, but are not limited to, a manufacturing supply system, an accounting system, a billing system, a customer management system and a payroll system. The specific number of customers 103-7, suppliers 113-5 and business processes 123-5 are used for the sake of an example only; the claimed subject matter applies equally well to small, medium and large enterprises with any particular number of such relationships.

Enterprise 101 incorporates a virtualized infrastructure, or an "On-Demand services (ODS) Framework," 129, which, in this example, is an e-business on demand (EBOD) environment designed by International Business Machines Corp. (IBM), of Armonk, N.Y. The IBM EBOD environment is designed for business customers and delivers accounting, human resource, and customer relationship management applications over the Internet for a usage-based charge.

Figure 2:
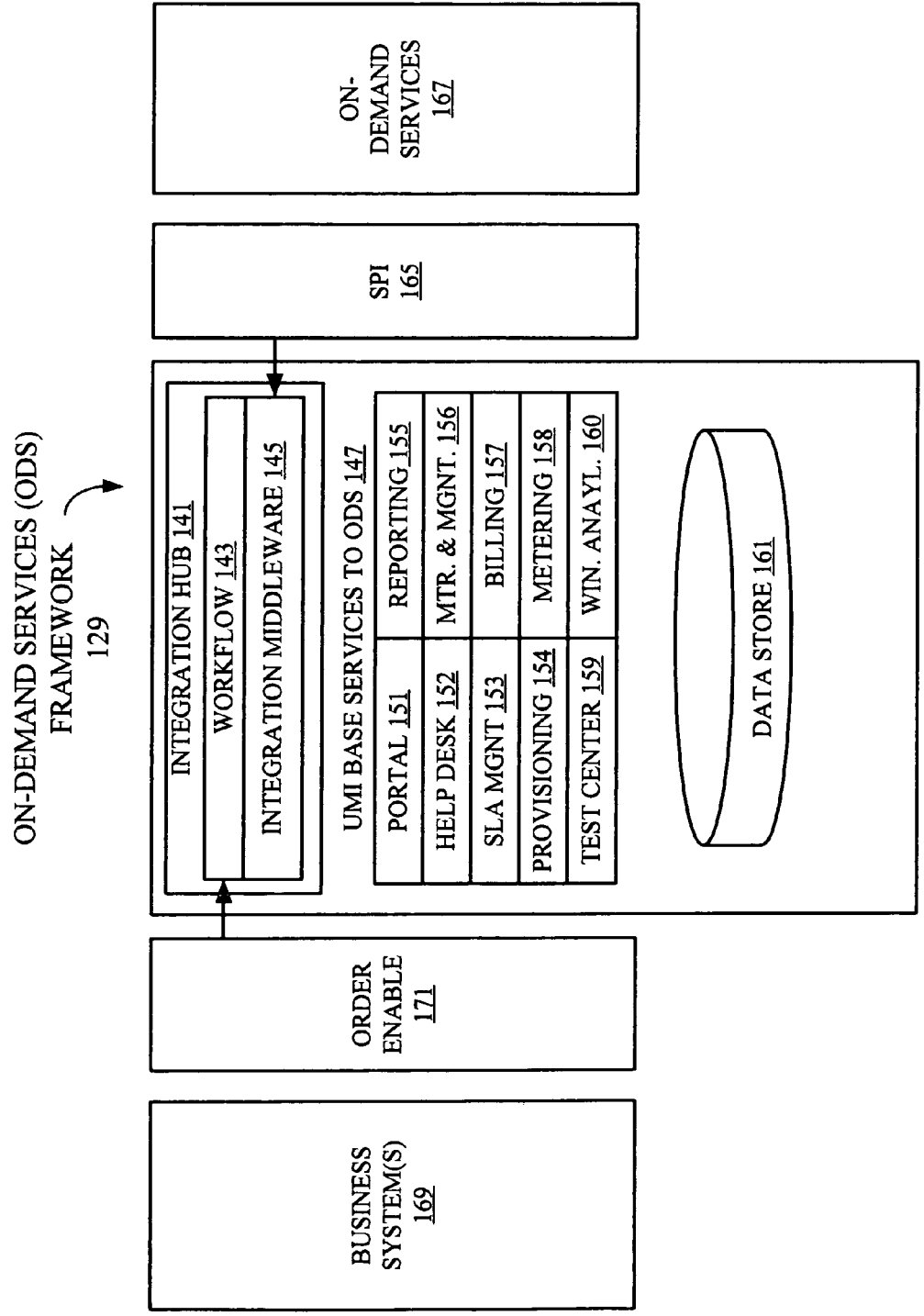
FIG. 2 is a block diagram an On-Demand Service (ODS) framework in which the claimed subject matter may be implemented.

FIG. 2 is a block diagram of ODS Framework 129 of FIG. 1 in more detail. Included in FIG. 2 is an ODS block 167 representing the various on-demand services that may be available in an ODS environment such as the IBM EBOD environment. As mentioned above, examples of ODS services include, but are not limited to, a manufacturing supply system, an accounting system, a billing system, a customer management system and a payroll system. In this example ODS services 167 are coupled to ODS framework 129 via a service programming interface (SPI) 165. In this example, SPI 165 is a set of application programming interfaces (APIs). Those with skill in the computing arts should recognize that there are other ways to implement the connection between ODS block 167 and ODS framework 129 other than via SPI 165, such as but not limited to secure sockets.

Also included in FIG. 2 is a business systems block 169, which represent any or all particular business process 123-5 (FIG. 1) that may be required to provide access to one or more of the various ODS services offered by enterprise 101 (FIG. 1). Business systems 169 is coupled to ODS framework 129 via an order enable block 171, which can represent software, hardware or human operators for communicating information from business systems to ODS framework 129.

ODS framework 129 includes an integration hub 141 for coordinating the interactions among business system 169, ODS services 167 and ODS framework 129. Integration hub 141 includes a workflow component 143 and an integration middleware component 145. Workflow component 143 manages communication and requests from business systems 169 and integration middleware component 145 and communication and requests from ODS block 167. While workflow component 143 communicates primarily with integration middleware component 145, integration middleware component 145 is responsible for handling communication and requests from workflow component 143, ODS services block 167 and a UMI Base Services to ODS block 147.

UMI base services 147 include a portal 151, which is a communications interface between UMI base services 147, the rest of ODS framework 129 and any entity, such as software from another vendor, that is external to ODS framework 129 and requires a direct communication link to UMI base services 147. Those with skill in the computing arts will realize there are a number of methods of implementing portal 151, including but not limited to, APIs and secure sockets. Additional components of UMI base services 147 include a help desk component 152, a service level agreement (SLA) component 153, a provisioning component 154, a reporting component 155, a monitoring and management (M&M) component 156, a billing component 157, a metering component 158, a test center component 159 and a window analysis component 160.

Help desk component 152 may be either an automated system such as a typical telephone response system or a fully or partially human staffed system in which help desk component 152 serves to automate communication and data retrieval tasks for employees that work at a corresponding help desk department of enterprise 101.

Service level agreement (SLA) management component 153 monitors and controls the interactions between ODS framework 129 and who or whatever interacts with ODS framework 129, such as customers 103-7 (FIG. 1) and/or suppliers 113-5 (FIG. 1). A SLA is typically a contractual agreement between the provider of ODS framework 129 and a particular customer or supplier concerning the amount of resources of ODS framework 129 to which the customer or supplier is entitled. In other words, SLA management component 153 determines whether or not a particular customer or supplier is meeting, exceeding or otherwise complying with their specific SLA and then takes appropriate actions based upon that information. Data concerning SLAs is stored in a data store 161.

Provisioning engine 154 provides for the automation of tasks and the distribution of resources related to the setup and modification of accounts within ODS framework 129. Specifically, provisioning engine 154 enables the creation and modification of resources such as servers, data storage, network resources and firewalls. In addition, provisioning engine 154 facilitates the distribution of software within the ODS framework 129.

Reporting component 155 is responsible for the production of reports on any or all of enterprise 101; business processes 123, 124 and 127; a corresponding customer 103-7; or supplier 113-5 and ODS framework 129. Reports may include, but are not limited to, production reports, billing reports, inventory reports, customer reports, performance reports and SLA compliance reports. Pre-defined report templates and generated reports are stored in data store 161.

M&M component 156 is responsible for the collection of information on and provides the interface for the management of ODS framework 129 and the other UMI base services 147. Collected information is stored in data store 161 and is made available, either directly or through data store 161, to help desk 152, reporting component 155 and a billing component 157, explained below.

Billing component 157 produces invoicing and billing information for customers and suppliers for their respective use of ODS framework 129, based primarily on information from SLA management component 153, and a metering component 158, described below.

Metering component 158 keeps track of customers 103-7 and suppliers 113-5 use of ODS framework 129, as well as any necessary internal information relative to the operation of ODS framework 129. Information collected by metering component 158 is stored in data store 161 and available for use by help desk component 152, reporting component 155, M&M component 156 and billing component 157.

Test center component 159 controls such activities as customer profiling, test data generation, and test storage and scheduling for ODS framework 129. Finally, Window Analytics component 160, with the help of various other components as described below, implements the method of the claimed subject matter. Window analysis component 160 is described in more detail below in conjunction with FIGS. 3 and 7.

Figure 3:
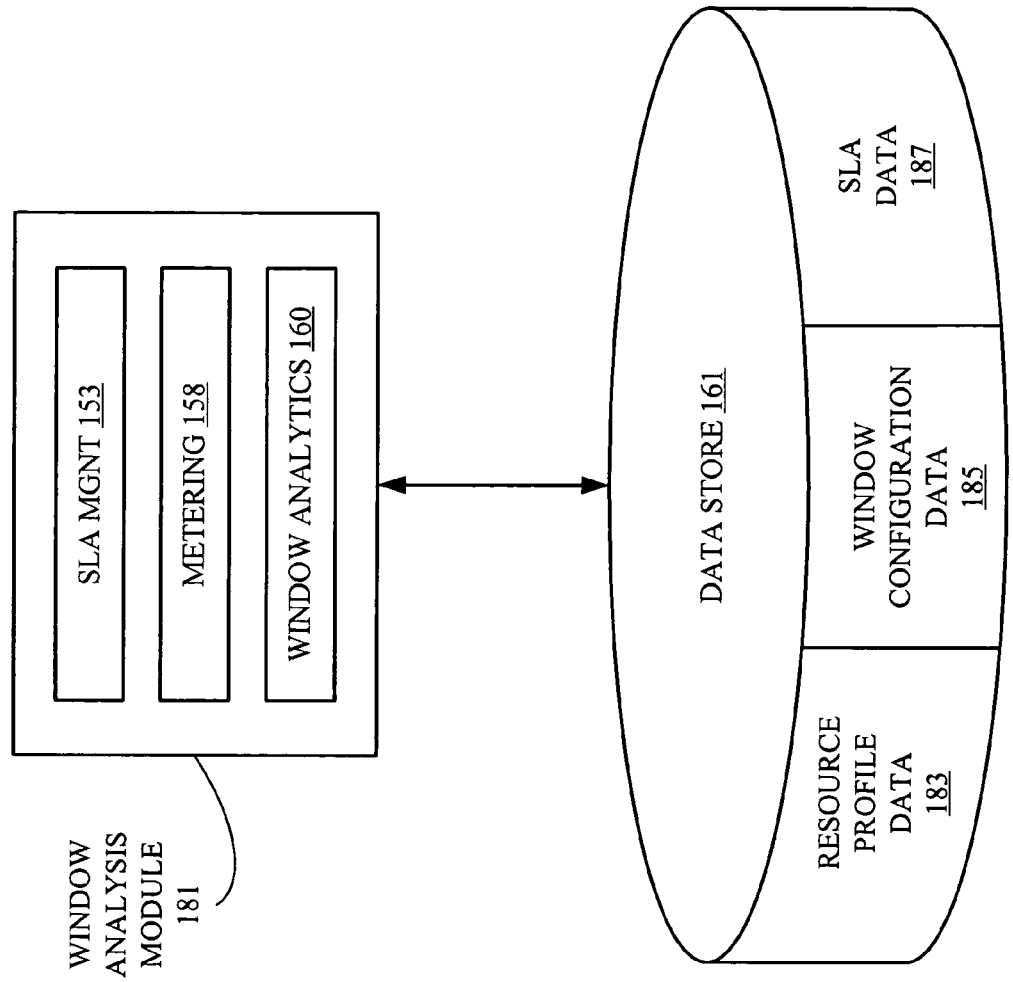
FIG. 3 is a block diagram of a particular portion of the ODS framework, illustrated in FIG. 2, that is relevant to the claimed subject matter.

FIG. 3 is a block diagram of a portion of ODS framework 129, illustrated above in FIG. 2, which is employed to implement the claimed subject matter. A Window Analysis Module logical block 181 includes SLA Management component 153 (FIG. 2), Metering component 158 (FIG. 2) and Window Analytics component 160 (FIG. 2). Although only components 153, 158 and 160 are illustrated as part of Window Analysis Module logical block 181, other components may also be involved in with the claimed subject matter. For example, Reporting component 155 may also be employed to service customer needs with respect to receiving information concerning the occurrence and analysis of anomalous events. Provisioning component 154 may be called to action when analysis indicates that particular resources need to be either allocated or de-allocated.

Metering component 158, which as explained above in conjunction with FIG. 2, keeps track of customers 103-7 and suppliers 113-5 use of ODS framework 129, also measures information relating to the performance of monitored resources. Information relating to the monitoring of resources is primarily stored in a Resource Profile (RP) data 183 of data store 161.

Window Analytics block 160, which as explained above in conjunction with FIG. 2 provides for the automatic monitoring of resources within ODS framework 129. Block 160 determines whether or not a particular event or condition warrants further automated or human analysis or intervention. Examples of monitored resources include, but are not limited to, servers, data storage, network resources and firewalls. A Window Analysis process 300 is explained in more detail below in conjunction with FIG. 7.

SLA Management component 153 is included in Window Analysis Module 181 because any analysis of a particular resource may be impacted by the parameters of a specific customer's service level agreement. For example, even though a particular service is shown to be needed by a customer according to the disclosed method, the customer's SLA may preclude the allocation of that resource.

In addition to containing RP data 183, data store 161 also includes Window Configuration (WC) data 185 and SLA data 187. As explained above, RP data 183 includes information concerning clients' resources allotments in ODS framework 129 as well as any other available resources. Examples of allocated resources might include, but are not limited to, processing cycles, number of required servers, network bandwidth and data storage requirements. Each of the allocated resources have parameters associated with them, such as a base resource allotment, a maximum resource allotment, a resource cost and rules for dynamically reallocating the resources based upon the client's workload demand. An example of an available resource is the types of available processors.

Memory associated with WC data 185 is explained in more detail below in conjunction with FIGS. 4-5. SLA Data 187 includes information concerning customers' SLAs, which is employed by SLA Management component 153 for, among other things, to determine whether or not a particular resource can be allocated or de-allocated.

Figure 4:
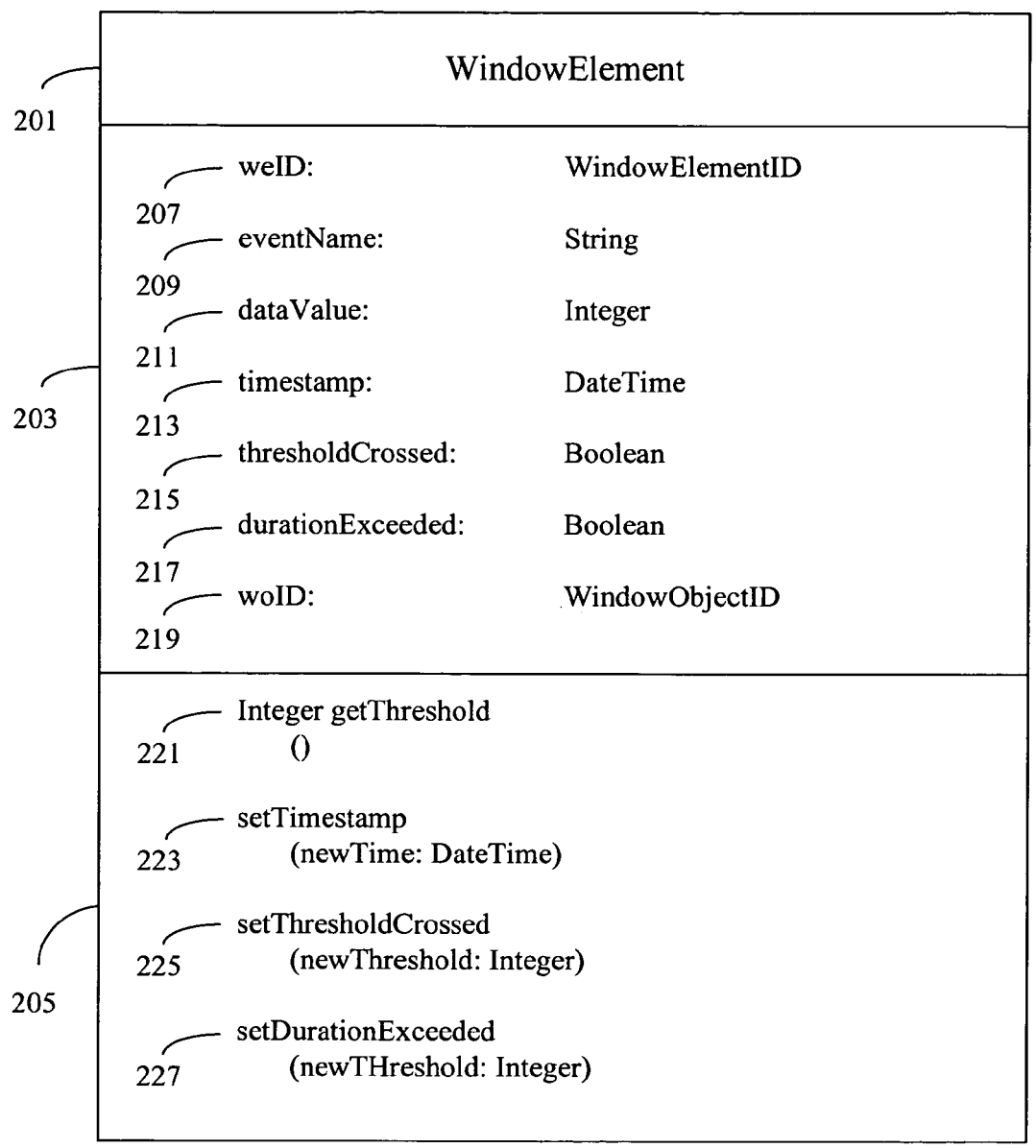
FIG. 4 is an exemplary WindowElement memory object employed in an implementation of the claimed subject matter.

FIG. 4 illustrates an exemplary Window Element (WE) memory object 200 employed in an implementation of the claimed subject matter. WE memory object 200 includes a title section 201, which merely states the name of object 200, an attribute section 203, which contains memory elements, or attributes, associated with WE memory object 200, and a method section 205, which includes functions, or methods, that are executed in conjunction with WE memory object 200.

Attribute section 203 includes a "weID" attribute 207, an "eventName" attribute 209, a "dataValue" attribute 211, a "Timestamp" attribute 213, a "thresholdCrossed" attribute 215, a "durationExceeded" attribute 217 and a "woID" attribute 219. Instantiations of object 200 are stored in WC data 185 (FIG. 3) of data store 161 (FIGS. 2 and 3).

WeID attribute 207 is a variable of type WindowElementID that contains a reference to a particular instance of object 200.

Each instance of object 200 has a unique value for attribute 207 that allows each instance to be uniquely identified. WeID attribute 207 is employed to locate information concerning a particular element of a window object (see FIG. 5) in order to monitor and manage a resource associated with that window object. EventName attribute 209 is a variable of type String that stores the name of a particular type of event associated with a particular instantiation of object 200.

DataValue attribute 211 is a variable of type Integer that stores a value corresponding to a particular threshold associated with this particular incident of object 200. Threshold values are explained in more detail below in conjunction with FIG. 6. Timestamp attribute 213 is a variable of type DateTime that stores a value corresponding to the date and time object 200 was generated.

ThresholdCrossed attribute 215 is a variable of type Boolean that stores a value indicating whether or not the value stored in attribute 211 violates the acceptable threshold value of the corresponding resource. Of course any particular threshold may be a lower or upper limit for acceptable values. For example, if the resource is a disk drive, a threshold value might be set at five hundred (500) Kbytes of free space, such that, if a scan of the disk drive indicates there is less than 500 Kbytes of free space available, then the threshold is considered violated.

DurationExceeded attribute 217 is a variable of type Boolean that stores a value indicating whether or not the value stored in attribute 211 represents a value that both violates the threshold and that represents a threshold measurement that sufficiently many attribute 211 values of immediately previous instantiations of object 200 have also violated. Threshold and duration values are explained in more detail below in conjunction with FIG. 6.

WoID attribute 219 is a variable of type WindowObjectID that stores a value corresponding to a specific window object 230 with which object 200 is associated. Window event objects 230 are described in more detail below in conjunction with FIG. 5.

Method section 205 of object 200 includes a "getThreshold" method 221, a "setTimestamp" method 223, a "setThresholdCrossed" method 225 and a "setDurationExceeded" method 227.

GetThreshold method 221 is called, without parameters, to determine a threshold value for the resource with which object 200 is associated. Method returns an Integer variable corresponding to the threshold value, stored in a threshold attribute 271 (see FIG. 6).

SetTimestamp method 223 is called to set the value of timestamp attribute 213. Method 223 is called with one (1) paramteter, "newTime," typically set to a value of "NULL," in which case, attribute 213 is set with the value of the current date and time. If a value is stored in the newTime parameter, then attribute 213 is set to the stored value.

SetThresholdCrossed method 225 is called to set the value of thresholdCrossed attribute 215. A newValue parameter passes in a measured value that is compared to a threshold attribute 271 returned by getThreshold method 221. If the newValue parameter violates the stored threshold, then thresholdCrossed attribute 215 is set to a value of '1'. Otherwise, attribute 215 is set to a value of '0'.

Finally, setDurationExceeded method 227 is called to set the value of DurationExceeded attribute 217. A newValue parameter passes in a measured value that is compared to a threshold attribute 271 returned by getThreshold method 221. If the newValue parameter violates the stored threshold, then method 227 checks previous instantiations of object 200 to determine whether or not thresholdCrossed attributes 215 have been set for a period of intervals exceeding the value stored in a thresholdDuration attribute 275 (see FIG. 6). If the value of newThreshold both violates threshold attribute 271 and has done so for a sufficient number of intervals, then attribute 217 is set to a value of '1'. Otherwise, attribute 217 is set to a value of '0'.

Figure 5:
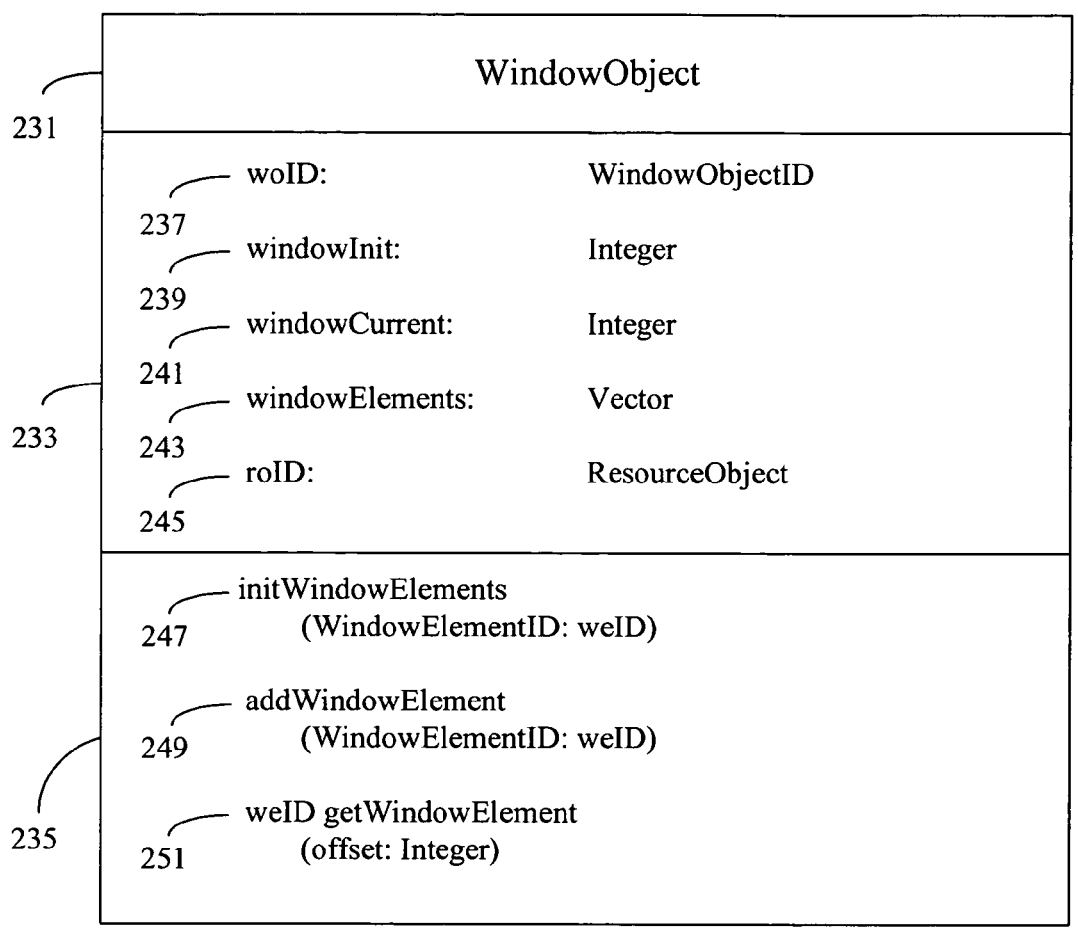
FIG. 5 is an exemplary WindowObject memory object employed in an implementation of the claimed subject matter.

FIG. 5 is an exemplary Window Object (WO) memory object 230 employed in an implementation of the claimed subject matter. WO memory object 230 includes a title section 231, which merely states the name of object 230, an attribute section 233, which contains memory elements, or attributes, associated with WO memory object 230, and a method section 235, which includes functions, or methods, that are executed in conjunction with WO memory object 230.

Attribute section 233 includes a "woID" attribute 237, a "windowInit" attribute 239, a "windowCurrent" attribute 241, a "windowElements" attribute 243 and a "roID" attribute 245. Instantiations of object 230 are stored in WC data 185 (FIG. 3) of data store 161 (FIGS. 2 and 3).

WoID attribute 237 is a variable of type WindowObjectID that contains a reference to a particular instance of object 230. Each instance of object 230 has a unique value for attribute 237 that allows each instance to be uniquely identified.

WindowInit attribute 239 is a variable of type Integer that stores a value corresponding to the initial size in terms of numbers of polling intervals (see element 277, FIG. 6) for a particular instantiation of object 230. Any particular resource is assigned an initial window size as determined by best practices. Information about the initial window size of any particular resource is stored in RP data 183 (FIG. 3) of data store 161 (FIGS. 2 and 3). WindowCurrent attribute 241 is a variable of type Integer that stores a value corresponding to the current size of the window of object 230. The value of attribute 241 represents the size of the current window in terms of polling intervals defined for the corresponding resource. Typically, the value stored in attribute 241 would be equal the value stored in attribute 239, but this value can be changed either programmatically or by a user in order to make the system either more or less sensitive.

WindowElements attribute 243 is a variable of type Vector that stored a list of WE objects such as object 200 (FIG. 4). Attribute 243 can be implemented by, but is not limited to, such means as a linked list or a database. RoID attribute 245 is a variable of type ResourceObject, which is described in more detail below in conjunction with FIG. 6. Simply stated, attribute 245 stores a variable that uniquely identifies a specific ResourceObject with which the current instantiation of object 230 is associated.

Method section 235 of object 230 includes an "initWindowElements" method 247, an "addWindowElement" method 249 and a "getWindowElement" method 251.

InitWindowElements method 247 is called when object 230 is created and its tasks include initializing variables 241, 243 and 245. Method 247 is called with one (1) parameter, "woID," which is a window element object 200 (FIG. 4). If woID is set to the value "NULL," then attribute 243 is created as an empty vector. Otherwise, the window element object 200 passed in to method 247 is used as the first element in attribute 243.

AddWindowElement method 249 is called to add a window element 200 to attribute 243, which as described above as a collection of window elements 200. In a polling system, like that described in conjunction with FIG. 7, method 249 is called every time a poll of the associated resource is executed. AddWindowElement method 249 is called with one (1) parameter, "weID," which represents an appropriately initialized instantiation of object 200, which is added to the list of elements stored in attribute 243.

Finally, getWindowElement method 251 is called to retrieve window elements objects 200 from attribute 243. Method 251 returns an object such as WE memory object 200 and is called with one (1) parameter, "offset," an Integer that represents a corresponding window element 200 stored in attribute 243. For example, if offset is set to a value of '0', '1' or '2', then method 251 returns the first, second or third element of attribute 243, respectively. If there is no corresponding element, then method 251 returns a value of "NULL." In this manner, a process such as process 300 (see FIG. 7) is able to retrieve individual memory elements 200 of attribute 243 for processing.

Figure 6:
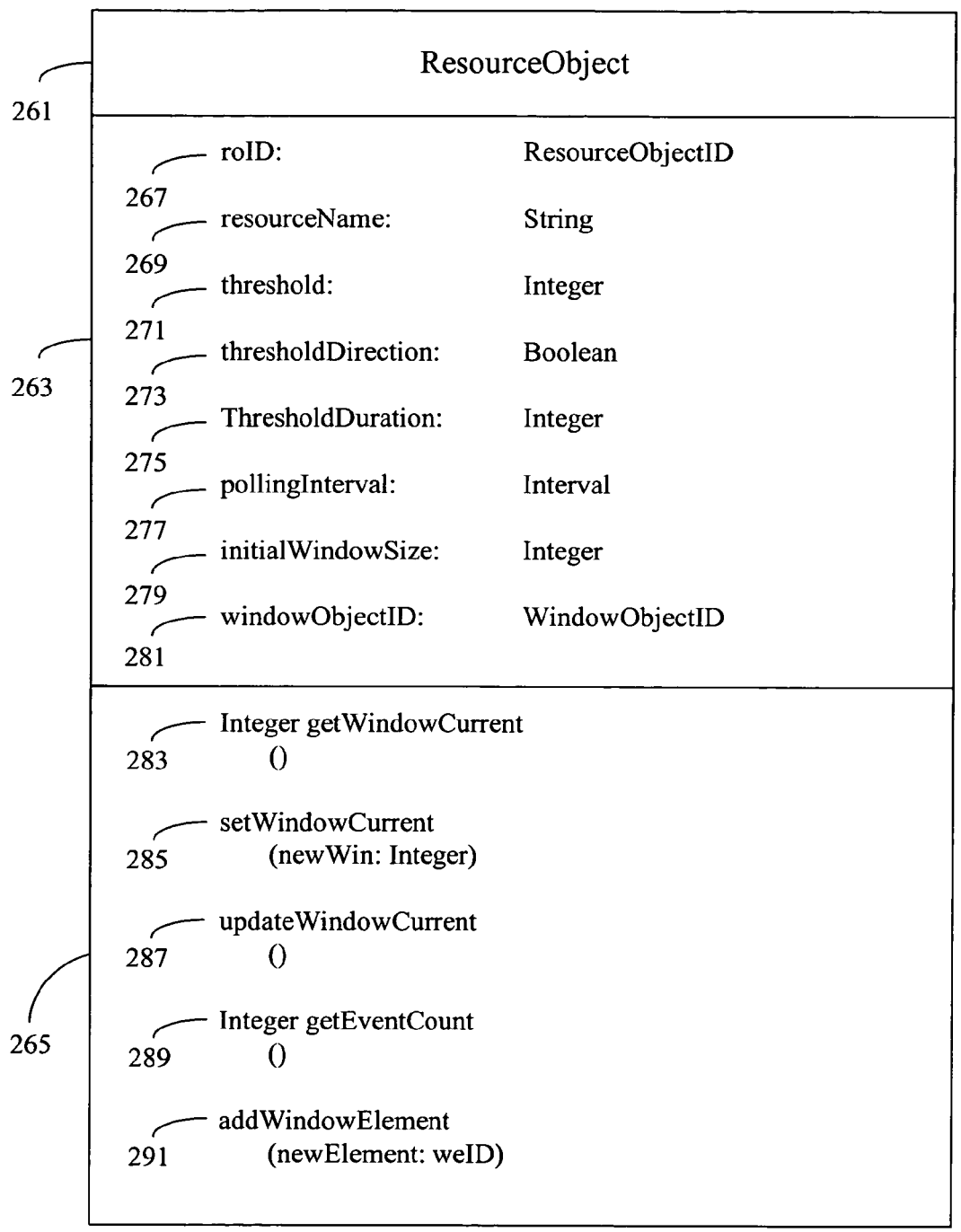
FIG. 6 is an exemplary ResourceObject memory object employed in an implementation of the claimed subject matter.

FIG. 6 is an exemplary Resource Object (RO) memory object 260 employed in an implementation of the claimed subject matter. RO memory object 260 includes a title section 261, which merely states the name of object 260, an attribute section 263, which contains memory elements, or attributes, associated with RO memory object 260, and a method section 265, which includes functions, or methods, that are executed in conjunction with RO memory object 260.

Attribute section 263 includes a "roID" attribute 267, a "resourceName" attribute 269, a "threshold" attribute 271, a "thresholdDirection" attribute 273, a "thresholdDuration" attribute 275, a "pollinginterval" attribute 277, an "initialWindowSize" attribute 279 and an "windowObjectID" attribute 281. Instantiations of object 260 are stored in RP data 183 (FIG. 3) of data store 161 (FIGS. 2 and 3).

RoID attribute 261 is a variable of type ResourceObjectID that contains a reference to a particular instance of object 260. Each instance of object 260 has a unique value for attribute 261 that allows each instance to be uniquely identified. ResourceName attribute 269 is a variable of type String that stores the name of a particular type of resource associated with a particular instantiation of object 260. Both roID attribute 261 and resourceName attribute 269 can be employed to locate information concerning a particular resource in order to monitor and manage the resource according to the claimed subject matter.

Threshold attribute 271 is a variable of type Integer that stores a value corresponding to a limit of acceptable measurements of the corresponding resource. For example, if the resource is a disk drive, than the value five hundred (500) Kbytes might be a value for free space below which the disk drive is not desired to fall. In other words, 500 Kbtes is the disk drive's threshold and, if a measured value of four hundred (400) Kbytes is received, the value crosses, or "violates," threshold attribute 271. ThresholdDirection attribute 273 is a variable of type Boolean that stores a value that indicates whether the value stored in attribute 271 represents a minimum or a maximum threshold. In the disk drive example, the value of attribute 273 is set to '0' indicating that 500 Kbytes is a minimum. If the resource was CPU utilization and threshold 271 is set to a value of '75' indicating that the CPU's should not exceed seventy-five percent (75%) utilization, then the value of attribute 273 is set to '1' indicating that 75 is a maximum.

ThresholdDuration attribute 275 is a variable of type Integer that stores a value representing duration, or a predetermined number of polling intervals, that a threshold must be crossed before the resource is considered in a potentially interesting situation. For example, the free space of a disk drive might occasionally drop below the 500 Kbyte minimum during the transfer of large data files, but the disk drive is not considered to be in an anomalous condition unless free space remains low for a long enough interval, e.g. three (3) or more intervals. In this case, the value of attribute 275 for this particular resource would be set to a value equal to '3'. In an alternative embodiment, rather than consecutive threshold crossing events, thresholdDuration attribute 275 can store information representing an unacceptable percentage of threshold crossing events over a specified number of measurements. For example, an anomalous condition may be defined as any time there are three (3) threshold crossing events within four consecutive polling intervals.

PollingInterval attribute 277 is a variable of type Interval that stores a value representing how often the corresponding resource should be polled, for example, every one (1) or ten (10) second(s). InitialWindowSize attribute 279 is a variable of type Integer that stores a value corresponding to an appropriate window size for the corresponding resource, or the number of intervals in the initial window. WindowObjectID attribute 281 is a variable of type WindowObjectID that stores a unique identifier to a WO object 230 corresponding to the current RO object 260.

Method section 265 of object 260 includes a "getWindowCurrent" method 283, a "setWindowCurrent" method 285, a "updateWindowCurrent" method 287, a "getEventCount" method 289 and an "addWindowElement" method 291.

GetWindowCurrent method 283 is called during an Event Analysis process 300 described below in conjunction with FIG. 7. GetWindowCurrent method 283 is called without parameters and returns an Integer representing the value of windowCurrent attribute 241 (FIG. 5) of the object 230, pointed to windowObjectID attribute 281, associated with the current RO object 260. SetWindowCurrent method 285 is called during Event Analysis process 300 to set the value of attribute 241 of the object 230 pointed to by windowObjectID attribute 281. SetWindowCurrent method 285 is called with one (1) parameter, "newInt," which is of type Integer, and is used to update the value of attribute 277.

UpdateWindowCurrent method 287 is called when threshold attribute 271 is modified. Method 287 is called with no parameters and updates window elements vector 243 (FIG. 5) and the corresponding memory elements 200 (FIG. 4) to reflect the new value for attribute 271.

GetEventCount method 289 is called without a parameter and returns an Integer representing the number of window element objects 200 currently stored in window elements vector 243.

AddWindowElement method 291 is called by process 300 to add a new window element object 200 to window element vector 243. Method 291 is called with one (1) parameter, "weID," which represents an initialized instantiation of object 200. Typically, method 291 is called once per polling interval to store the corresponding resource's measured values.

It should be understood that WE object 200, WO object 230 and RO object 260 are only examples of memory objects that may be used to implement the claimed subject matter. Other memory objects with fewer, more and/or different attributes and methods may be employed. One with skill in the computing arts should appreciate there are many ways to implement the functionality and data storage requirements of the claimed subject matter. For example, the claimed subject matter may be implemented by means of a computer program in conjunction with a relational database.

Figure 7:
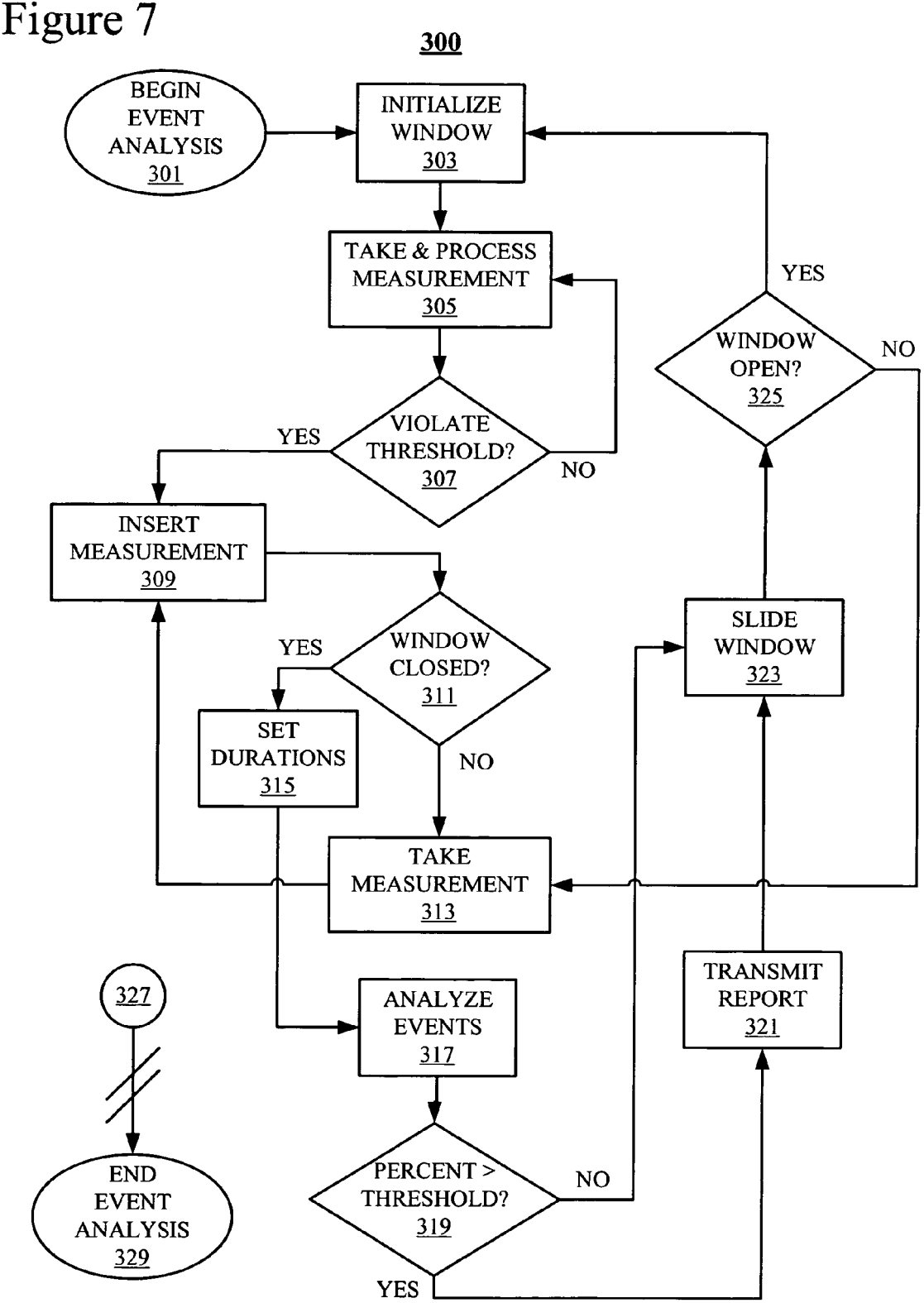
FIG. 7 is a flowchart of an exemplary Event Analysis process implementing the claimed subject matter.

FIG. 7 is a flowchart of an exemplary Event Analysis process 300 that illustrates one method of implementing the claimed subject matter with respect to a single, exemplary resource. For the sake of convenience, in the following example, the resource is sometimes referred to as a disk memory device. Process 300 starts in a "Begin Event Analysis" block 301 and proceeds immediately to an "Initialize Window" block 303 during which an WO memory object 230 (FIG. 5) is created for the disk drive resource based upon information stored in the resource's corresponding RO memory object 260. Some actions that occur during the initialization of WO object 230 include setting roID attribute 245 (FIG. 5) equal to the value of roID attribute 267 (FIG. 6) and setting windowCurrentAttribute 241 (FIG. 5) equal to the value of initialWindowSize attribute 279 (FIG. 6). Through this example, a matrix, such as [* * * * * * * * * *], represents the values of thresholdCrossed attribute 215 of windowElements 200 stored in an exemplary WindowElements vector 243 of WO memory object 230. The '*' character represents an empty memory storage space vector 243; a '1' character represents an WE memory object 200 with attribute 215 set to '1', i.e. a threshold has been crossed in the corresponding measurement; and a '0' character represents an WE memory object 200 with attribute 215 set to '0'.

During a "Take & Process Measurement" block 305, a query is directed to a target resource, such as the disk drive used in this example. For example, the query might check the amount of free memory space available on the disk drive From block 305, control proceeds to a "Violate Threshold?" block 307 during which process 300 determines whether or not the data received during block 305 violates the value stored in threshold attribute 271 (FIG. 6) of WE memory object 260 corresponding to the target resource. As explained above, this information is already stored in attribute 217 of the corresponding WE memory object 200. As explained above in conjunction with FIG. 6, whether the data violates threshold 271 depends, upon whether attribute 271 represents a minimum or a maximum value as defined in thresholdDirection attribute 273 (FIG. 6). In this example, process 300 is configured so that block 305 is executed at regular time intervals, for example, once per second.

If the data received during block 305 does not cross threshold 271, then control returns to block 305 and processing continues as described above. If, during block 307, process 300 determines that the measurement crosses the relevant threshold attribute 271, then control proceeds to an "Insert Measurement" block 309 during which process 300 instantiates a WE memory object 200 (FIG. 4) corresponding to data returned from the query and inserts the new WE memory object 200 into window elements 243 of WO memory object 230 created in block 303.

At this point in this example, the matrix would be [1 * * * * * * * * *]. The value of the returned data is stored in dataValue attribute 211 (FIG. 4), timestamp attribute 213 (FIG. 4) is set to the current date and time, thresholdCrossed attribute 215 (FIG. 4) is set based upon whether or not violate threshold 271 (FIG. 6). The concept of threshold crossing or violation is explained in detail above in conjunction with FIG. 6.

Following Insert Measurement block 309, control proceeds to a "Window Closed?" block 313 during which process 300, as described above, determines whether or not the number of WE memory objects 200 equals the value stored in windowCurrent attribute 241. If not, then control proceeds to a "Take Measurement" block 313 during which process 300 takes another measurement of the targeted resource, after waiting the appropriate period of time. Control then returns to Insert Measurement block 309 and processing continues as described above. Of course, thresholdCrossed attribute 215 is either set to '0' or '1' depending upon whether or not the corresponding measurement crosses threshold 271. For example, if threshold 271 is not crossed, then, in the example started above, the matrix becomes [1 0* * * * * * * *].

If, during block 311, process 300 determines that the window is closed, i.e. the number of WE memory object 200 equals the value stored in windowCurrent attribute 241, then control proceeds to a "Set Durations" block 315 during which process 300 evaluates each WE memory object 200 stored in windowElements vector 243 in light of the other window elements 200 in vector 243 to determine the persistence of threshold-crossing events. The resulting data is stored in corresponding durationExceeded attributes 217. For example, after multiple iterations through blocks 309, 311 and 313, the example matrix may look like [1 0 0 1 1 0 1 0 1 0], indicating that all memory locations allocated for WE memory objects 200 have been filled.

Control the proceeds to an "Analyze Events" block 317 during which process 300 examines windowElements attribute 243 with respect to the percent of stored WE memory objects 200 that are marked as having violated threshold 271 and thresholdExceeded attribute 217. Control then proceeds to a "Percent >Threshold?" block 319 during which process 300 determines whether of not the percent of anomalies calculated in block 317 and the respective values of durationexceeded attribute 217 justify further examination of the anomalous WE memory objects 200. If not, process 300 proceeds to Slide Window block 323. If so, then control proceeds to a "Transmit Report" block 321 during which process 300 reports to Reporting module 155 (FIG. 2) so that performance reports can be generated, if necessary. In addition, during block 321, the data stored in WE memory object 200 of WO memory object 230 are transmitted to Window Analytics module 160 (FIGS. 2 and 3) for any necessary further analysis of the corresponding resource. Control then proceeds to Slide Window block 323.

During Slide Window block 323, process 300 deletes, from windowElements vector 243, WE memory objects 200 from the first window element 200 up to, but not including, the next WE memory object 200 that is marked as being in violation of threshold 271, as determined by checking the value of the corresponding thresholdCrossed attribute 215. The example matrix would thus become [1 1 0 1 0 1 0* * *]. If there are no threshold 271 crossing events past the first, then all WE memory objects 200 are deleted, i.e. the matrix becomes [* * * * * * * * * *].

Control then proceeds to a "Window Open?" block 325 during which process 300 determines whether or not the window of WO memory object 230 is completely open, i.e. there are no threshold-crossing events stored in vector 243, i.e. the matrix is set to [* * * * * * * * * *]. If this is the case, control returns to Initialize Window block 303 and processing continues as described above. If the modified window from block 323 includes threshold-crossing events, then control returns to Take Measurement block 313 and processing continues as described above.

Of course, the example above is only one example of numerous variations that may be implemented both with respect to the sliding of a window, the events that open and close a window and the setting of the various parameters. Any specific configuration appropriate for a particular situation is determined by best practices in conjunction a determination of the desired results and sensitivity of the system.

Finally, a block 327 represents an asynchronous event that causes process 300 to proceed to an "End Event Analysis" block 329 in which process 300 is complete. Examples of an asynchronous event include, but are not limited to a signal from a control panel (not shown) or the discontinuation of power to a computing device that is executing process 300. Until such an asynchronous event occurs, process 300 is designed to operate continuously.

It should be understood that the description above represents only one particular implementation of the claimed subject matter. For example, rather than a system based upon periodic polling of resources, the claimed subject matter may be implemented in an event-driven system in which the resources themselves initiate the transmittal of information to the system in a manner consistent with their functionality.

While the invention has been shown and described with reference to particular embodiments thereof, it will be understood by those skilled in the art that the foregoing and other changes in form and detail may be made therein without departing from the spirit and scope of the invention, including but not limited to additional, less or modified elements and/or additional, less or modified blocks performed in the same or a different order.

We claim:

1. A method of detecting resource events in a utility computing environment, the method comprising:
   periodically retrieving a measurement corresponding to a resource;
   defining a first threshold for the resource measurement;
   defining a duration attribute;
   detecting a first measurement that crosses the threshold;
   storing in a memory the first measurement and an indicator of threshold crossing;
   for a number of periods corresponding to a second threshold, periodically retrieving subsequent measurements corresponding to the resource and storing in the memory the measurements and corresponding indicators of whether or not the subsequent measurements cross the first threshold; and
   signaling a resource event if the number of stored threshold crossing measurements, which are part of any contiguous group of threshold crossing events such that the number of threshold crossing events in the corresponding contiguous group is greater than the duration attribute, exceed a third threshold after said number of periods.

2. The method of claim 1, further comprising investigating the functionality of the resource if a resource event is signaled.

3. The method of claim 1, further comprising generating a report on the first and subsequent measurements and the resource if a resource event is signaled.

4. The method of claim 1, further comprising,
   discarding the first measurement and corresponding indicator and each subsequent measurement and corresponding indicator preceding a second measurement in which the threshold was crossed; and
   continuing the retrieving, storing and signaling.

5. The method of claim 1, further comprising,
   determining, after the number of periods, whether or not only one threshold crossing measurement is stored;
   discarding all the measurements and corresponding indicators if only one threshold crossing measurement is stored;
   continuing the periodically retrieving and detecting; and
   continuing the storing of measurements and indicators once a measurement crosses the first threshold.

6. The method of claim 1, wherein a score is calculated based upon the duration attributes.

* * * * *